United States Patent [19]

Landsman et al.

[11] 4,373,014
[45] Feb. 8, 1983

[54] PROCESS USING NOBLE METAL-CHROMIUM ALLOY CATALYSTS IN AN ELECTROCHEMICAL CELL

[75] Inventors: Douglas A. Landsman, West Hartford; Francis J. Luczak, Galstonbury, both of Conn.

[73] Assignee: United Technologies Corporation, Hartford, Conn.

[21] Appl. No.: 278,249

[22] Filed: Jun. 29, 1981

Related U.S. Application Data

[62] Division of Ser. No. 160,517, Jun. 18, 1980, Pat. No. 4,316,944.

[51] Int. Cl.³ .............................................. H01M 8/00
[52] U.S. Cl. ....................................... 429/13; 429/40; 429/44
[58] Field of Search ...................... 429/13, 40, 44, 46; 252/470, 472, 514

[56] References Cited

U.S. PATENT DOCUMENTS

| | | | |
|---|---|---|---|
| 3,346,421 | 10/1967 | Thompson et al. | 429/44 X |
| 3,428,490 | 2/1969 | Bravo et al. | 429/44 |
| 3,506,494 | 4/1970 | Adlhart | 429/44 X |
| 3,615,836 | 10/1971 | Batzold | 429/44 |
| 4,126,934 | 11/1978 | Richter | 429/44 X |
| 4,185,145 | 1/1980 | Breault | 429/44 |
| 4,192,907 | 3/1980 | Jolan et al. | 429/44 X |
| 4,202,934 | 5/1980 | Jolan | 429/44 X |

FOREIGN PATENT DOCUMENTS

1074862 7/1967 United Kingdom.

*Primary Examiner*—Charles F. LeFevour
*Attorney, Agent, or Firm*—Harry J. Gwinnell

[57] ABSTRACT

A novel and improved noble metal-chromium alloy catalyst is disclosed with catalytic oxygen reduction activity at least twice that of the unalloyed noble metal. The noble metal-chromium alloy catalyst disclosed has particular utility as an electrocatalyst for the reduction of oxygen which makes it particularly useful as a cathode catalyst in an acid fuel cell.

3 Claims, 1 Drawing Figure

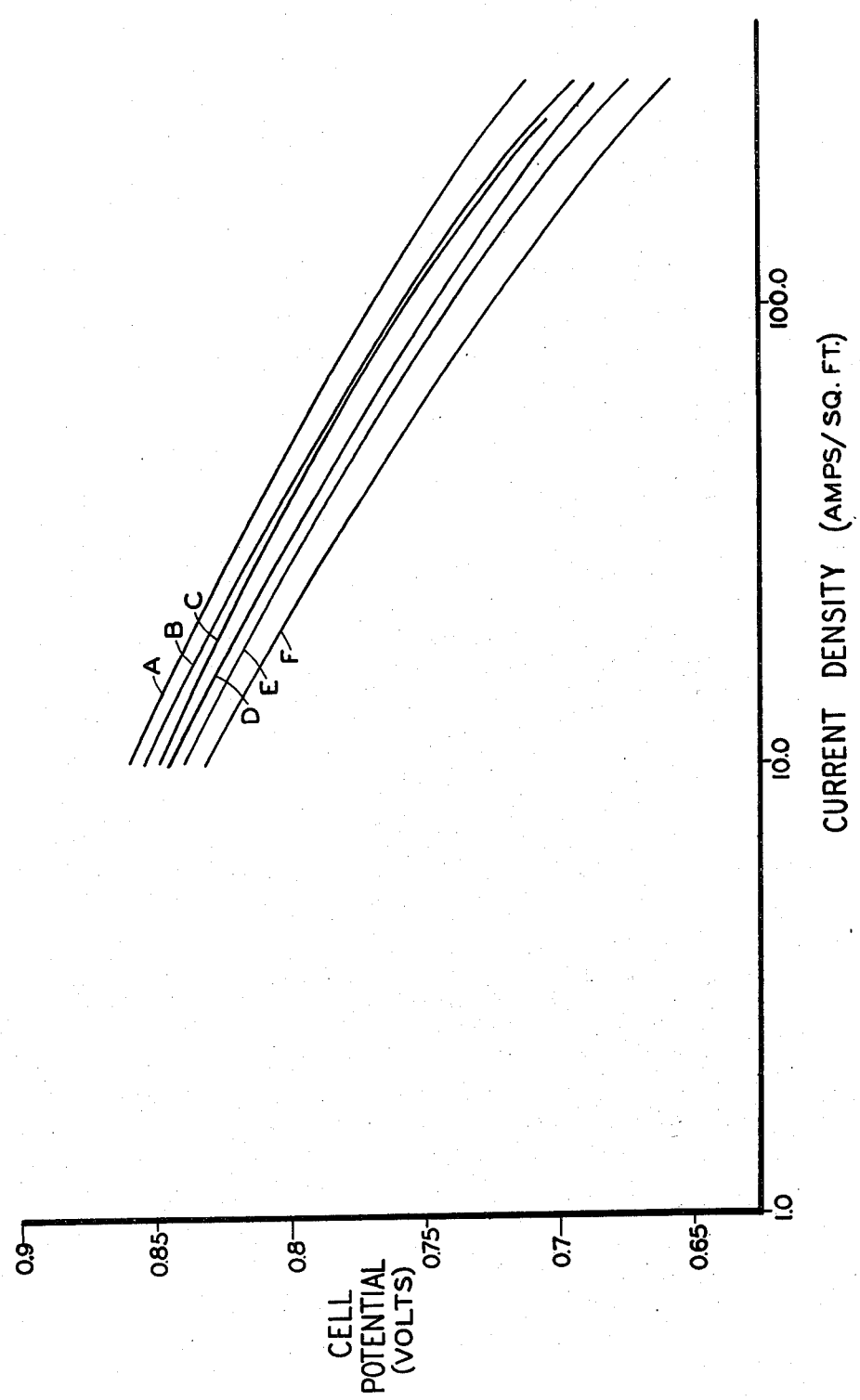

PROCESS USING NOBLE METAL-CHROMIUM ALLOY CATALYSTS IN AN ELECTROCHEMICAL CELL

This is a division of application Ser. No. 160,517, filed on June 18, 1980, now U.S. Pat. No. 4,316,944.

DESCRIPTION

1. Technical Field

The present invention relates to noble metal alloy catalysts for use in fuel cell electrodes and other catalytic structures.

2. Background Art

A fuel cell is a device which converts the energy of a chemical reaction between a fuel and oxidant directly into low voltage, direct current electricity. To obtain a high efficiency of conversion it is necessary that the reactions of the fuel and oxidant occur in such manner that the amount of energy degraded into heat is as small as possible. At the same time, the rates of reaction must be high enough to produce, economically, a useful amount of current from a cell of practical size. For this reason, it is customary to incorporate catalysts in the fuel cell which accelerate the reactions occurring at the electrodes.

A typical fuel cell comprises a fuel electrode or anode, an oxidant electrode or cathode, an electrolyte positioned between the electrodes and means to introduce fuel and oxidant to the respective electrodes. Each electrode is typically comprised of a porous, conductive substrate with a layer of catalyst disposed on the surface which faces the electrolyte.

In operation the fuel, commonly hydrogen, is fed to the anode where it is oxidized at a catalytic surface in the presence of electrolyte with the liberation of electrons. Simultaneously oxygen or air is fed to the cathode where it is reduced at a catalytic surface in the presence of electrolyte with the consumption of electrons. The electrons generated at the anode are conducted to the cathode through wires external to the cell and constitute a flow of electrical current which can be made to perform useful work.

In developing fuel cells for space, commercial and industrial applications a great deal of research has been carried out to find improved catalysts. For example, prior art has demonstrated that the activity per unit mass of a catalyst, usually a noble metal, can be enhanced by dispersing it in the form of finely divided particles over the surface of a metallic or carbon support material of high surface area. This approach has proved especially useful in fuel cell applications utilizing acid electrolytes, for example, where particulate platinum is highly dispersed on a conductive support material such as carbon black and the supported catalyst, mixed with a suitable bonding agent such as Teflon ® (Dupont) is applied as a thin layer on a conductive carbon paper or metal screen to form an electrode.

In addition, the prior art has demonstrated that certain alloys of noble metals exhibit increased catalytic activity and/or increased resistance to sintering and dissolution in fuel cell and other electrochemical and chemical processes when compared to the unalloyed noble metal catalysts. For example, U.S. Pat. No. 3,506,494 describes a method for producing a ternary alloy for use at the anode of a fuel cell. The ternary alloy consists of platinum, ruthenium, and a metal selected from the group gold, rhenium, tantalum, tungsten, molybdenum, silver, rhodium, osmium, or iridium. Although it is stated, at column 3 at lines 67-70 of this patent, that the alloy catalyst may be dispersed on a high surface area carrier such as carbon powder, no method is specifically taught for doing so.

U.S. Pat. No. 3,428,490 describes another method for making a fuel cell anode electrode. In this case, unsupported platinum is alloyed with aluminum and applied to an electrode substrate. The aluminum is then leached out to the extent possible to form the finished electrode. The removal of the aluminum produces a large number of reaction sites or voids in the electrode. It is stated that the voids increase the surface area and thus, the activity of the catalyst. Although this patent indicates, at column 6 at lines 26-29, that some aluminum may still be present in the electrode composition after leaching, it is believed that the amount remaining is not significant and it would be present only in those areas which could not be reached by the leaching solution. The patent teaches no method for making a noble metal-aluminum alloy which is supported.

It is also known that some alloys may be made by co-reducing intimate mixtures of reducible metal salts. For example, the method of co-reducing metal salts in the presence of a support material is used to make a supported, finely-divided, platinum-iron alloy as explained in an article by C. Bartholomew and M. Boudart entitled "Preparation of a Well Dispersed Platinum Iron Alloy on Carbon" from the *Journal of Catalysis*, pages 173-176, Vol. 25, No. I, April 1972. However, salts of many metals are not readily reduced by this method. Such metals are those which form the more stable refractory oxides, e.g., titanium, zirconium, hafnium, vanadium, niobium, tantalum, chromium, molybdenum, tungsten, cerium, magnesium, aluminum, silicon and calcium.

It has also been observed that platinum and other noble metals and noble metal alloys in bulk form react with many refractory metal oxides at high temperatures to form solid solution alloys or intermetallic compounds and that these reactions are accelerated by the presence of reducing agents such as carbon, hydrogen, carbonmonoxide and certain organic vapors. See *Platinum Metals Review* 20, No. 3, page 79, July 1976.

U.S. Pat. No. 3,341,936 teaches forming an alloy comprising "a nobler and a less noble metal" on an electrode substrate surface, however, the less noble metal is dissolved out "so that only the nobler metal is retained on the electrode body in finely sub-divided form" (col. 2, lines 29-32). Furthermore, although methods for producing both fuel electrodes and oxygen electrodes are described in this patent, the method for making oxygen electrodes which is described at col. 2, lines 12-23 does not involve an alloy catalyst at all. U.S. Pat. No. 3,380,934 is also directed only to anode electrodes and is similar to U.S. Pat. No. 3,341,936 in that the less noble metal of the alloy is leached out (col. 2, lines 24-32). U.S. Pat. No. 3,340,097 is of general interest in the area of alloy catalysts but relates to noble metal alloy catalysts such as platinum-tin-and ruthenium.

British Pat. No. 1,074,862 describes an unsupported noble metal ternary alloy wherein one of the metals in the alloy may be chromium.

U.S. Pat. No. 4,127,468 despite its teaching to improve electrode-catalytic properties existent in a basis metal or to obtain such properties by employing an alloying element noticeably avoids some groups, such as group VIB of the Periodic Table (i.e. Cr, Mo, W).

U.S. Pat. No. 3,615,836 relates to a process for improving the catalytic activity of certain alloyed and unalloyed metal catalysts when used in fuel cells. However, this patent is only applicable to prior art catalysts which include halide ions, which are theorized to poison the catalyst when the catalyst is used in an acid electrolyte fuel cell. The patent is directed to removing or desorbing these halide ions. It is the desorption of these halide ions which the reference claims results in a more efficient catalyst. While a long list of possible alloying metals are recited (note col. 2, line 17 supra.), no particular combination is recognized as being superior.

While U.S. Pat. Nos. 4,186,110 and 4,192,907 do disclose noble metal-base metal alloy catalysts, no extraordinary superiority is attributed to any particular system. And while there is superiority acknowledged in a particular noble metal/base metal alloy catalyst in U.S. Pat. No. 4,202,934 it is limited to one particular system—a noble metal-vanadium alloy.

As used herein, "noble metals" refers to those metals of the second and third triads of group VIII of the Periodic Table, also referred to as the palladium and platinum groups respectively. These metals are ruthenium, rhodium, palladium and osmium, iridium and platinum.

DISCLOSURE OF INVENTION

The present invention is directed to a noble metal-chromium alloy catalyst with catalytic activity for oxygen reduction at least twice that of the unalloyed noble metal.

Another aspect of the invention is a process involving the catalytic reduction of oxygen using the above-described catalyst.

Another aspect of the invention is an electrochemical cell including the above-described catalyst.

Another aspect of the invention is a fuel cell including the above-described catalyst.

The foregoing, and other features and advantages of the present invention will become more apparent in the light of the following description and accompanying drawings.

BRIEF DESCRIPTION OF THE DRAWING

The FIGURE demonstrates cell voltages as a function of current density for various cathodes incorporating alloy catalysts and platinum.

BEST MODE FOR CARRYING OUT THE INVENTION

In the following discussion of this invention and in the appended claims, when catalytic activity comparisons are made, they are intended to be comparisons of mass activity. Mass activity is an arbitrarily defined measure of the effectiveness of a catalyst per unit weight of the catalytically active component. In the case of fuel cells with phosphoric acid as electrolyte, we define the mass activity of the cathode catalyst in milliamps/milligram (mA/mg) as the maximum current available due to oxygen reduction at 0.900 volt, the potential being measured relative to an unpolarized $H_2$/Pt reference electrode at the same temperature and pressure in the same electrolyte. A greater mass activity can be achieved by either increasing the surface area of the catalyst (e.g. by reducing the particle size) or by increasing its specific activity. Specific activity is defined as the $O_2$ reduction current, as specified above, which is available per unit surface area of the noble metal (i.e. $\mu A/cm^2$). The greater mass activity of the alloy of the present invention in comparison to the mass activity of both unalloyed noble metal and the best alloy known to date, e.g. the vanadium-noble metal of U.S. Pat. No. 4,202,934, is attained through improvement of the specific activity of the catalytic material in comparison to the specific activity of the unalloyed noble metal or vanadium-noble metal alloy.

The basic process for producing the noble metal chromium catalyst of the present invention, which can also be used to produce the other alloy catalysts recited in the Table as well, comprises adsorbing the chromium containing species, preferably in the anion form, on the supported noble metal catalyst, followed by heating the chromium impregnated catalyst in a reducing atmosphere to promote the alloy formation. The preferred anion as recited in the Example is the chromate and for the other alloys of the Table, the vanadate, manganate, molybdate, and tungstate anion form respectively.

TABLE

| SUPPORTED ALLOY CATALYST | $O_2$ ACTIVITY @ 0.9 VOLTS - mA/mg Pt | $H_2$/AIR IR FREE PERFORMANCE @ 375° F. @ 200 ASF - mV |
|---|---|---|
| Pt—Cr | 43 | 735 |
| Pt—V | 39 | 720 |
| Pt—Mn | 35 | 718 |
| Pt—Mo | 32 | 708 |
| Pt—W | 31 | 702 |
| Pt | 20 | 680 |

The method is equally well suited to making unsupported as well as supported alloys. However, since finely divided unsupported noble metals are limited, generally, to less than 50 $m^2/g$ of noble metal, this method is best practiced by using supported finely divided noble metals, which can be prepared in surface areas, generally, greater than 100 $m^2/g$ of noble metal. In any event, the novel resulting product of the present method is a supported or unsupported finely divided alloy of a noble metal and chromium having significantly enhanced overall catalytic activity relative to the supported or unsupported, respectively, unalloyed noble metal. Preferred alloys of the present invention have surface areas greater than 30 $m^2/g$ of noble metal; the most preferred alloys have surface areas greater than 50 $m^2/g$ of noble metal. Platinum is the preferred noble metal when the alloy is to be used as a catalyst in phosphoric acid fuel cells.

EXAMPLE I

A platinum-chromium alloy catalyst of high surface area supported on carbon was prepared in the following manner: 20 gms. of platinum-on-graphitized-carbon-black (containing 10% platinum by weight) was dispersed in 1000 ml of water followed by ultrasonic blending for 15 minutes. The pH of the solution as then raised to 8 with dilute ammonium hydroxide solution to counter the natural acidity of the supported catalyst. Stirring continued during and after pH adjustment. A solution of 12 gms. of ammonium chromate in 100 ml of water was then added to the pH adjusted solution. Following addition of the complete 100 ml of solution, dilute hydrochloric acid was added to the solution until a pH of 5.5 was attained to cause the adsorption of the chromium species on the supported catalyst. Stirring continued for one hour. After filtering, the solids were dried at 90° C. and sifted through a 100 mesh screen.

The sifted solid was then heat treated at 1700° F. in flowing nitrogen for one hour to form the platinum-chromium alloy catalyst. It should be noted that while graphitized Vulcan XC-72 (Cabot Corporation) was used in this Example, other carbons in the graphitized or ungraphitized form or acetylene black have also been used as support material.

While it is difficult to measure the exact amount of chromium in the improved alloy catalysts because of the small size of the alloy particles, based on X-ray diffraction data on the formed catalysts it has been concluded that the improved results described herein can be achieved with up to about 30 atomic percent chromium in the alloy and preferably about 25 atomic percent chromium.

To demonstrate the superiority of the noble metal-chromium alloy catalysts according to the present invention, a series of comparative tests was performed as indicated in the Table. Several individual batches of each catalyst were prepared. Cathodes were made from each catalyst batch and tested in two inch by two inch laboratory fuel cells. The cells were run and the voltages measured at a cell current density of 200 ASF (amps per square foot). The average of the highest measured performances for each catalyst in repeated testing is listed in the Table. As can be clearly seen from the Table, the noble metal-chromium alloy has a catalytic activity far superior to any other alloy tested, and more than twice that of the unalloyed noble metal catalyst itself. All of the electrodes contained the same platinum loading, i.e. ½ milligram of Pt/cm$^2$. Catalyst performance was evaluated at standard conditions for each catalyst, i.e. cell current density of 200 ASF, 99% phosphoric acid electrolyte, 375° F. cell temperature, hydrogen gas-air reacting gases at high gas flow rate, i.e. low oxygen utilization, with the voltage at the given currents corrected to eliminate internal cell resistance (IR-free). The catalysts were prepared by methods which were found to give the best cathode performances for each individual alloy, for example, as described in the above cited Example and the methods described in commonly assigned U.S. Pat. Nos. 4,186,110; 4,192,907; and 4,202,934, the disclosures of which are incorporated by reference.

The FIGURE demonstrates graphically cell voltages as a function of current density for a variety of catalytic material. In the graph, A represents a Pt-Cr alloy catalyst, B a Pt-V alloy catalyst, C a Pt-Mn alloy catalyst, D a Pt-Mo alloy catalyst, E a Pt-W alloy catalyst and F an unalloyed Pt catalyst. The alloy catalysts were prepared by the method as described herein and the data graphed using the standard test conditions as described for obtaining the data in the Table. As can be seen from the graph the voltages obtained from cells with the Pt-Cr catalyst are clearly higher than the voltages obtained from cells containing any of the other alloys or unalloyed Pt over the entire range of current densities.

The performance advantage of the Pt-Cr catalyst over the Pt-V catalyst appears to be relatively small—only 15 mV at 200 ASF (the Table). From an energy conversion standpoint, however, this difference has considerable practical significance which may be more fully appreciated if one considers not the increase in voltage at a fixed current density, but rather the increased current density obtained at a fixed voltage. Thus, a fuel cell with Pt-V as the cathode catalyst will give 118 amps/ft$^2$ at 0.75 volt whereas an identical cell with Pt-Cr as the cathode catalyst will deliver 146 amps/ft$^2$ at the same voltage (the FIGURE). Since the voltage of a cell is a measure of its efficiency, the cell with the Pt-Cr alloy cathode will operate at a 20% higher power density than a cell with a Pt-V alloy cathode at the same efficiency.

In prolonged running of phosphoric acid fuel cells, it has also been found, quite surprisingly, that the platinum chromium of the present invention has significantly more long term stability in this aggressive environment than other alloys tested, e.g. platinum-vanadium. For example, in an accelerated catalyst corrosion test, to determine the relative stability of alloy catalysts in a corrosive (fuel cell type) environment, Pt-V and Pt-Cr alloy catalysts were immersed in 99% phosphoric acid saturated with air at 350° F. In this test the catalyst assumed an electrochemical potential of about 0.9 volt relative to a hydrogen reference electrode. After 48 hours 67.5% by weight of the vanadium had been dissolved from the V-alloy catalyst whereas only 37.5% of the chromium had been dissolved from the Cr-alloy catalyst.

The alloy catalysts of this invention may find application not only as catalysts in fuel cell electrodes but also as catalysts in the chemical, pharmaceutical, automotive and anti-pollution fields. The alloy catalysts of the present invention have particular utility as electrocatalysts for the reduction of oxygen. This activity makes these catalysts particularly suitable in an acid fuel cell. However, as stated above, their use is not limited to a fuel cell and they can be used in any environment where electrochemical oxygen reduction takes place as part of the process, e.g. in a metal-air battery.

Although the invention has been shown and described with respect to detailed embodiments thereof, it should be understood by those skilled in the art that various changes and omissions in form and detail may be made therein without departing from the spirit and the scope of the invention.

We claim:

1. A process in an electrochemical cell involving catalytically reducing oxygen, the step of catalytically reducing oxygen using a catalyst comprising a platinum-chromium alloy, said alloy having a catalytic activity for the reduction of oxygen at least twice that of the platinum in unalloyed form wherein the surface area of the platinum in the alloy is at least 30 m$^2$/g.

2. The process according to claim 1 wherein the alloy is supported.

3. The process according to claim 2 wherein the alloy is supported on carbon.

* * * * *